(12) United States Patent
Werning et al.

(10) Patent No.: US 8,007,353 B1
(45) Date of Patent: Aug. 30, 2011

(54) CLEAN GRAIN CONVEYOR FOR AN AGRICULTURAL COMBINE

(75) Inventors: Jason L. Werning, Blue Grass, IA (US); Ronald W. Nelson, Geneseo, IL (US); Merle Gerber, Moline, IL (US); Emily N Horn, Hampton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/752,474

(22) Filed: Apr. 1, 2010

(51) Int. Cl.
  *A01F 12/52* (2006.01)
(52) U.S. Cl. .......................................... 460/13; 460/14

(58) Field of Classification Search .................... 460/22, 460/119, 13, 14, 114
See application file for complete search history.

(56) References Cited

U.S. PATENT DOCUMENTS

| | | | | |
|---|---|---|---|---|
| 2,410,012 A * | 10/1946 | Churchman | ................. | 198/302 |
| 3,265,226 A * | 8/1966 | Malcolm | ....................... | 414/502 |
| 3,575,306 A * | 4/1971 | Obermeyer et al. | .......... | 414/523 |
| 5,505,583 A * | 4/1996 | Gaddis et al. | ................. | 414/526 |
| 6,053,811 A * | 4/2000 | Johnson et al. | ................. | 460/6 |
| 6,350,197 B1 * | 2/2002 | Cooksey et al. | ............. | 460/114 |

* cited by examiner

*Primary Examiner* — Alicia M Torres

(57) ABSTRACT

A clean grain conveyor for an agricultural combine (10) includes an auger conveyor (52) and a paddle elevator (53) that are connected by a transition tube (218) having a triangular aperture.

3 Claims, 4 Drawing Sheets

CLEAN GRAIN CONVEYOR FOR AN AGRICULTURAL COMBINE

FIELD OF THE INVENTION

The invention relates to agricultural combines. More particularly it relates to clean grain conveyors for agricultural combines. Even more particularly, it relates to clean grain augers and vertical paddle elevators for agricultural combines

BACKGROUND OF THE INVENTION

Agricultural combines are large machines that harvest, thresh, separate and clean agricultural crops that bear grain. The clean grain obtained is stored in a grain tank arranged on the combine. The threshed straw is generally chopped and spread out on the field across the width of the chopping mechanism.

In one common arrangement, grain is passed through a series of screens which are arranged to permit chaff to be blown away. The clean grain falls down to the bottom of the agricultural combine in a shallow trough. This trough extends laterally from side to side across the width of the agricultural combine and houses an elongate auger that draws the grain to one side of the combine and through an aperture in the side wall of the combine. Typically, a short transition tube is attached to the side wall of the combine and extending outward therefrom supports a short length of the auger and helps convey the grain in the bottom of the trough to the lower inlet portion of a paddle elevator that lifts the grain into a grain tank onboard the combine for later offloading to a vehicle traveling alongside.

As the harvesting capacity of agricultural combines increases, the amount of grain that must be carried by the auger and by the paddle elevator increases as well. One problem with the augers is that they are limited in the speed they can rotate and in their overall size. What is needed is a way of increasing the flow rate without increasing the outer diameter of the auger.

U.S. Pat. No. 6,053,811 illustrates a clean grain auger disposed at the lower portion of the combine and paddle elevator for lifting the grain up to the grain tank. In this embodiment, a short tubular section is provided to support the auger and carry the grain between the trough (see FIG. 1) and the paddle elevator (see FIG. 2). The tubular section is slightly ovoid in cross-section as best shown in FIG. 4. This ovoid shape permits a mechanical grain flow sensor to be inserted inside the short tubular section. This shows the sharp transition from the body of the agricultural combine at the entrance of the transition tube, which is almost exactly the same diameter as the helical auger flights it surrounds.

U.S. Pat. No. 6,350,197 illustrates a clean grain auger having a similar short tubular transition section. The short transition section is coupled to a circular aperture in the bottom of the paddle elevator. This traditional aperture and transition tube significantly disrupts grain low by the sharp entrance to the transition tube.

SUMMARY OF THE INVENTION

The problem underlying the invention is to provide an improved clean grain conveyor that provides less resistance to grain flow thus permitting an auger conveyor of a given size to convey more grain. This problem is solved according to the present invention by the teaching of Claim 1, while characteristics that further develop the invention in an advantageous manner are specified in the additional claims.

A transition tube for a clean grain auger of an agricultural combine is configured to be fixed to an external side wall of the combine and to a lower pulley housing of a paddle elevator configured to carry grain upward and into a grain tank of the agricultural combine.

The transition tube is configured to be fixed to cover a triangular aperture in the side wall of the combine and to cover a circular aperture in the lower pulley housing.

The end of the transition tube that is fixed to the triangular aperture has a mating triangular aperture of substantially the same dimensions. The triangular aperture in the side wall and the triangular aperture in the transition tube are dimensioned the same, such that when they are abutted the joint between the two does not form a dam that resists the flow of grain.

An auger extends from inside the combine, through the triangular apertures, and is coupled to a lower pulley inside the lower pulley housing to be driven synchronously therewith, either by the lower pulley driving the auger, or the auger driving the lower pulley.

The transition tube smoothly transitions from the triangular aperture at one end to a circular aperture at the other end such that the grain flowing into the triangular aperture of the transition tube is smoothly transitioned from the triangular entrance area to the circular exit area when it is introduced into the lower pulley housing.

Inside the body of the combine, a laterally extending trough is provided that is fixed within the body such that the contour of the trough matches the contour of the bottom of the triangular apertures. Further, the trough is disposed immediately adjacent the triangular aperture in the side wall of the agricultural combine such that the upper surface of the trough abuts the lower edge of the triangular apertures, thereby providing a smooth crop flow without a vertical barrier between the bottom of the trough and the bottom of the triangular aperture of the transition tube.

The triangular aperture in the side wall of the agricultural combine and the triangular aperture in the transition tube have an arcuate lower portion disposed directly below the rotational axis of the auger that extends across the bottom of the agricultural combine, through the transition tube, and is coupled to the lower pulley. The radius of the arcuate lower portion is slightly greater than the radius of the flights of the auger and are spaced slightly away from the auger flights a distance on the order of 1-3 cm. This provides sufficient clearance for the auger to be adjusted up and down, yet ensures that the grain will not be ground between the auger flights in the bottom of the trough or the bottom of the transition section.

BRIEF DESCRIPTION OF THE DRAWINGS

An embodiment of the invention will be described with reference to the drawings, wherein.

DETAILED DESCRIPTION OF THE PREFERRED EMBODIMENTS

Figure 1:
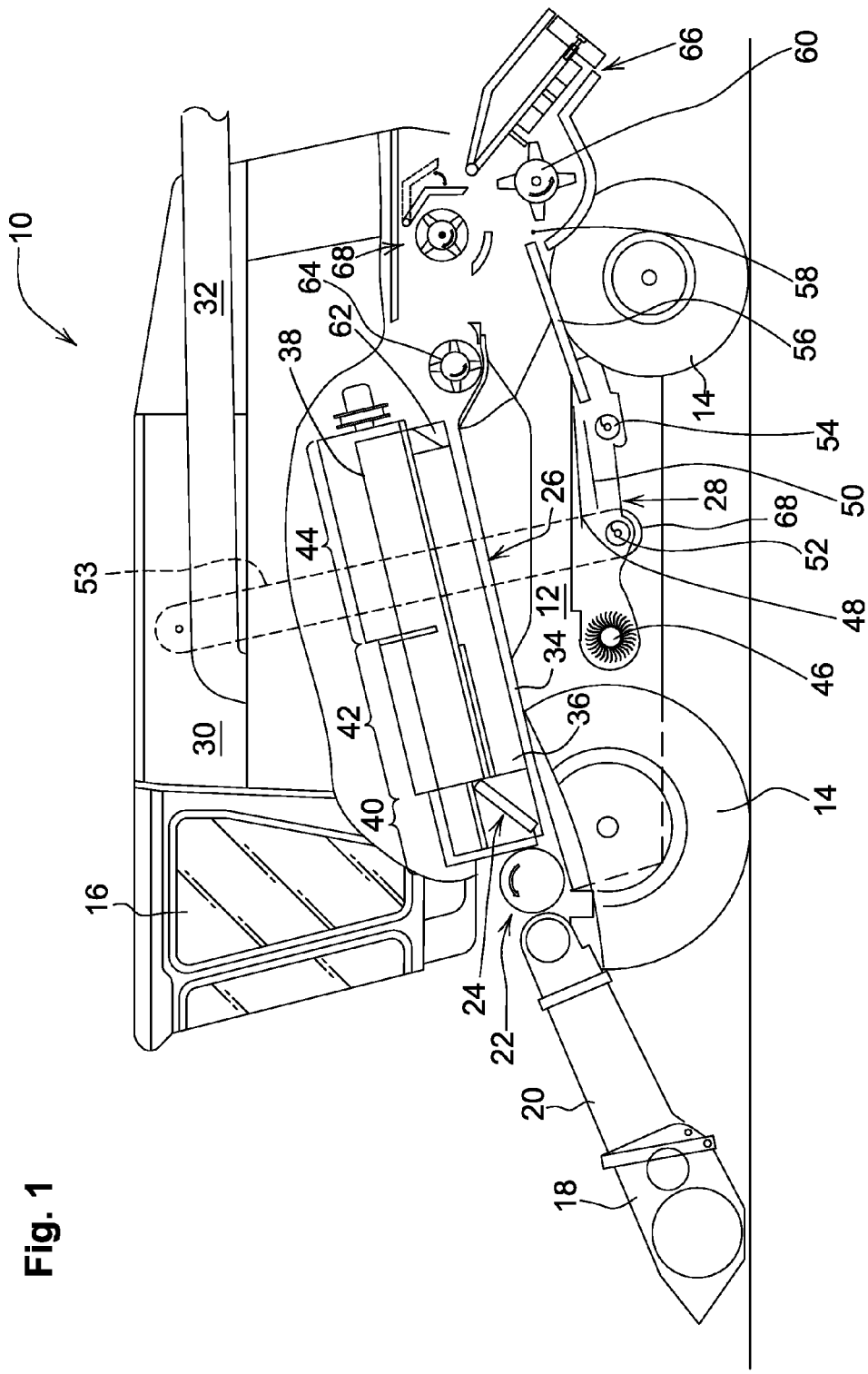
FIG. 1 shows a partial cutaway left side view of a combine that incorporates the present invention.

Directional terms in this specification such as "front" or "forward" refer to the forward direction of travel of combine 10, which is toward the left in FIG. 1. Directional terms such as "back" or "rear" refer to the reverse direction of travel of the combine—the direction opposite the forward direction, which is toward the right in FIG. 1. The terms "transverse", "lateral", "side-to-side" or the like refer to a generally horizontal direction that is at a right angle to the forward direction.

FIG. 1 shows an agricultural combine 10 with a chassis 12 with wheels 14 engaged with the ground that are mounted on chassis 12 and serve to propel combine 10 in the forward direction, which runs to the left in FIG. 1. The operation of combine 10 is controlled from the operator cab 16. A cutting mechanism 18 is used to harvest a crop containing grain and supply it to an inclined conveyor 20. The harvested crop is supplied by inclined conveyor 20 to a guide drum 22. Guide drum 22 directs the crop through a transitional section 24 to an axial crop processing device 26.

Crop processing device 26 comprises a rotor housing 34 and a rotor 36 arranged therein. Rotor 36 comprises a hollow drum 38 on which crop processing elements for a loading section 40, a threshing section 42 and a separation section 44 are mounted. Loading section 40 is disposed at the front end of the axial crop processing device 26.

Threshing section 42 and separation section 44 lie downstream and to the rear of loading section 40 in the longitudinal direction. Drum 38 has the shape of a truncated cone in loading section 40.

Threshing section 42 of drum 38 has a front section and a rear section. The front section has a truncated conical shape and the rear section has a conical shape. The cylindrical separation section 44 of drum 38 is situated at the end of axial crop processing unit 26. In place of an axial crop processing unit 26, a tangential threshing drum with an axial separation device or straw shaker following it can also be used.

Grain and chaff, which fall through a threshing basket associated with threshing section 42 and a separation grating associated with separation section 44, are fed to a cleaning system 28 with a fan 46, sieve 48, and chaffer 50 that can be set into a vibrating motion. Cleaning system 28 removes the chaff and feeds the clean grain via an auger conveyor 52 to a paddle elevator 53 for clean grain (shown in phantom lines in FIG. 1). The paddle elevator for clean grain elevates the grain and deposits the clean grain in a grain tank 30. The clean grain in grain tank 30 can be discharged by a discharge screw conveyor 32 onto a grain wagon, trailer or truck. Crop remaining at the rear end of the chaffer 50 is fed by means of a second auger conveyor 54 and a return conveyor (not shown) back to crop processing unit 26. The crop residues deposited at the rear end of sieve 48, which consist essentially of chaff (husks) and small straw particles, are conveyed by a vibrating conveyor 56 backward into an inlet 58 of a straw chopper 60.

Threshed straw exiting from separation section 44 is ejected from crop processing unit 26 by an outlet 62 and fed to a throw drum 64, which throws the straw to an overshot drum conveyor. The drum conveyor conveys the straw to straw chopper 60, which conveys the straw to blowers 66, which spread the straw over the ground.

Auger conveyor 52 extends laterally across the width of the agricultural combine. Auger conveyor 52 is disposed in a shallow trough 68, which also extends across the width of the agricultural combine. As grain is separated from chaff, which is blown to the rear by fan 46, it is conveyed to the far side of the combine (in FIG. 1) where it is collected by a paddle elevator 53 which carries the clean grain upward and deposits it in the grain tank.

Figure 2:
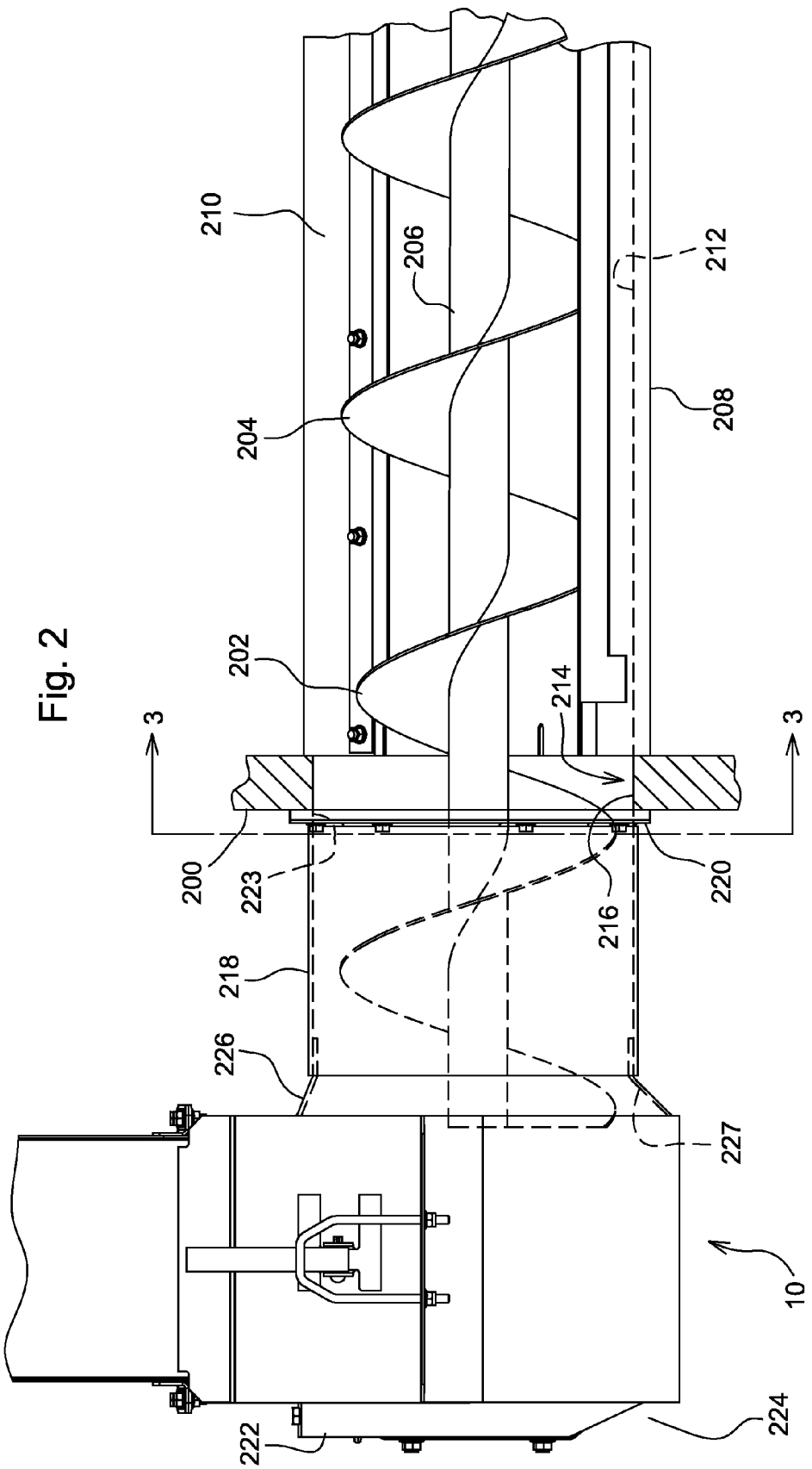
FIG. 2 shows a fragmentary front detail view along the right side of the combine showing features of the auger, the transition tube, and the paddle elevator.

Referring now to FIG. 2, the combine has a side wall 200, through which helical auger 202 of auger conveyor 52 extends. Helical auger 202 includes helical flights 204 that are fixed to an auger shaft 206. Shallow trough 68 is disposed inside the body 210 of combine 10, and has an inside surface 212 that is spaced a slight clearance distance away from the radially outermost extent of helical flights 204. This clearance distance is typically 1-3 cm.

A triangular aperture 214 is formed in side wall 200 having a vertical extent that is slightly larger than the outer diameter of helical flights 204. Triangular aperture 214 has a lower surface 216 that is disposed at the same height as inside surface 212, and is preferably spaced a slight distance away from the radially outermost extent of helical flights 204 to provide room to adjust the position of helical flights 204 and to reduce grain damage. This distance is typically 1-3 cm. Lower surface 216 adjacent to shallow trough 68 at side wall 200. This arrangement provides a smooth transition between shallow trough 68 and the bottom surface of triangular aperture 214 that avoids a vertical wall which could resist the passage of grain from shallow trough 68 into and through triangular aperture 214 in side wall 200.

A transition tube 218 has a central open passageway that extends from end to end and is configured to convey grain therethrough. Transition tube 218 has a first end and a second end. The first end defines a triangular aperture 223 at one end of the central open passageway of transition tube 218. This triangular aperture is fixed to the outside surface of side wall 200 by a flange 220 that extends radially outward from the triangular aperture of transition tube 218.

Transition tube 218 extends between the outside surface of side wall 200 and the lower housing 222 of paddle elevator 53. Lower housing 222 encloses a pulley having a rotational axis that is coaxial with the rotational axis of auger shaft 206. Paddle-type grain elevators and the manner of their coupling to clean grain augers are well known in the art.

The second end 226 of transition tube 218 defines a circular aperture 227 at the other end of the central open passageway and seals against lower housing 222.

Lower housing 222 has a circular opening of substantially the same diameter as the second end 226 of transition tube 218 to thereby permit the free flow of grain without any substantial barriers from second end 226 of transition tube 218 into the lower housing 222.

Figure 3:
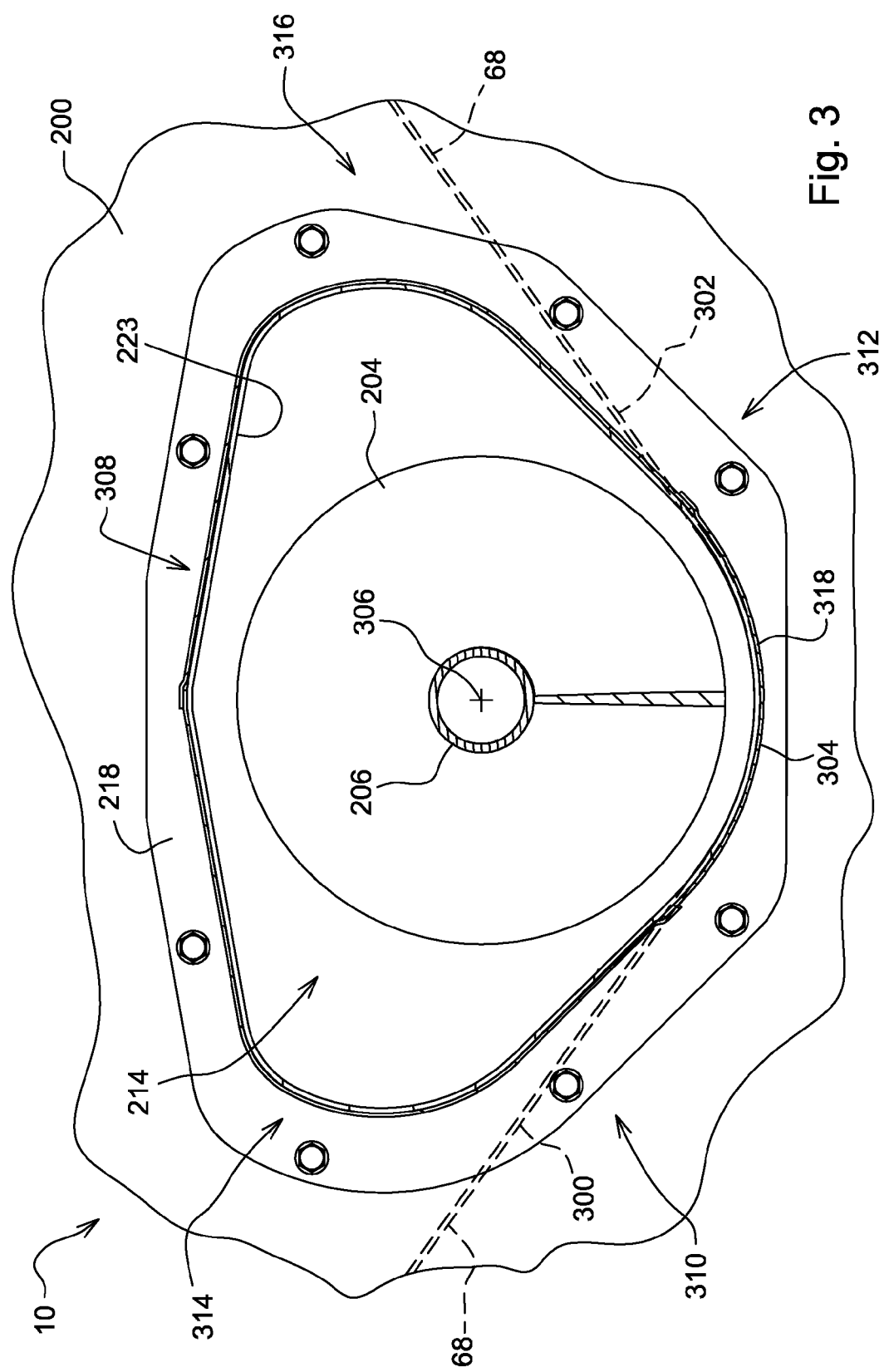
FIG. 3 shows a cross-sectional right side view of the combine in the region of the transition tube.

FIG. 3 is a right side view of the side wall 200 of agricultural combine 10 as taken at section line 3-3 in FIG. 2. A shallow trough 68 is in the form of two laterally extending planar sheets 300, 302 that are joined together by a laterally extending arcuate portion 304 located underneath rotational axis 306 of the auger. The center of arcuate portion 304 is also rotational axis 306.

The triangular aperture 223 of transition tube 218 where it abuts side wall 200 is in the form of an isosceles triangle with a generally horizontal top side 308, two equal sides 310, 312, left and right upper vertices 314, 316, and a lower vertex 318 disposed between the two equal sides 310, 312 and pointing downward. All the vertices of the triangular aperture 223 of transition tube 218 are radiused, including the lower vertex 318. The center of the radius of lower vertex 318 is concentric with axis 306. The center of the radius of lower vertex 318, the inside surface of aperture 214, and the inside surface 212 are spaced the same distance from axis 306, and are all preferably spaced 1-3 cm from the outermost edge of auger flights 204.

The two equal sides 310, 312 of the end of transition tube 218 that abuts side wall 200 are disposed immediately adjacent to and are at the same angle as planar portions 300, 302 of shallow trough 68 adjacent to arcuate portion 304.

By dimensioning and positioning the opening in transition tube 218 the same as the aperture 214 in side wall 200, and the same as the auger trough itself insures that no significant barriers are provided for grain flowing across the inner surface of auger trough 68, through aperture 214 in side wall 200, and into transition tube 218. This smooth transition enhances the flow of grain from the auger conveyor 52 into the paddle elevator 53.

Figure 4:
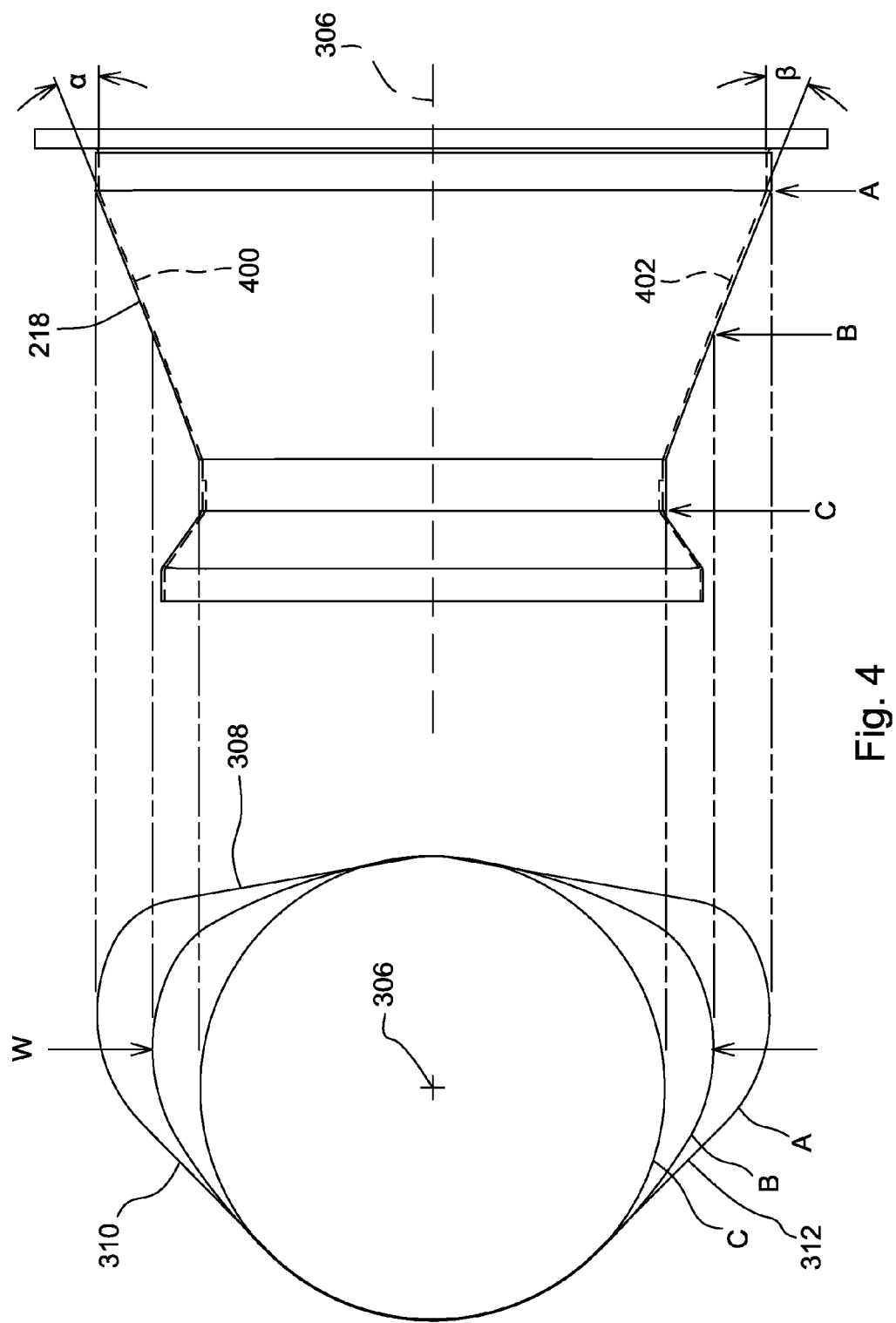
FIG. 4 shows the transition tube in a top view illustrating the smooth transition of the cross-sectional profile of the transition tube for triangular to circular.

Referring to FIG. 4, a top view of transition tube 218 is shown that helps illustrate and describe the smooth taper of the side walls of transition tube 218. This smooth transition enhances the flow of grain as it is pulled through transition tube 218 by auger flights 204

Three cross-sections A, B, C of transition tube 218 are shown superimposed on each other to the left of the top view of transition tube 218. These cross-sections show the contours of the inside surface of transition tube 218 in a direction perpendicular to the axis 306 of the helical flights 204.

Cross section A is at the axial end of the transition tube 218 immediately adjacent to side wall 200 of combine 10. It shows the rounded triangular arrangement of the triangular aperture 223 of transition tube 218.

Cross-section C is at the other axial end of the transition tube 218 immediately adjacent to lower housing 222. It shows the circular cross-section of transition tube 218.

Cross-section B is intermediate these two sections, approximately in the middle of transition tube 218 and shows an intermediate width W that is the average of the overall width of transition tube 218 at each end.

Other cross-sections, although not specifically illustrated, are similarly proportioned to be proportionately as wide as their proportionate position all along the axial length of transition tube 218. As a result, the radially outermost inside surface portions 400, 402 of transition tube 218 appear to be straight lines with a constant axially-inward taper of angles alpha, beta, respectively over their entire length. This distributes the inward force of the auger flights 204 evenly against the grain they are conveying along the axial length of transition tube 218. Furthermore, angles alpha and beta are preferably the same, thereby causing the grain to exert equal and opposite forces on each side of the auger flights 204 as the auger rotates, thereby equalizing the lateral loads on the auger flights 204 and extending the life of the bearings that support the auger conveyor 52.

The invention claimed is:

1. A clean grain conveyor for an agricultural combine (10) having a side wall (200), comprising:
    an auger conveyor (52) for conveying clean grain that extends laterally and horizontally in a lower portion of the combine, the auger conveyor (52) further comprising auger flights (204) having a longitudinal axis and disposed in a shallow trough (68);
    a paddle elevator (53) having a grain inlet is disposed to convey clean grain to a grain tank (30) of the agricultural combine (10) from the grain inlet; and
    a transition tube (218) having two ends, an inside height, an inside surface and an entire axial length, said two ends including a first end that defines a first triangular aperture (223) and a second end that defines a second aperture (227), wherein the first triangular aperture is fixed to a corresponding triangular aperture (214) in the side wall (200) and through which said auger flights (204) extend, and further wherein the second aperture is fixed to the grain inlet wherein radially outermost side surface portions (400), (402) of the inside surface of the transition tube (218) taper inwardly in a radial direction.

2. The clean grain conveyor of claim 1, wherein the height inside the transition tube (218) is constant over the entire axial length of the transition tube (218).

3. The clean grain conveyor of claim 1, wherein the radially outermost side surface portions (400), (402) taper inwardly at the same angle with respect to the longitudinal axis (306) of the auger flights (204).

\* \* \* \* \*